US006928175B1

(12) United States Patent
Bader et al.

(10) Patent No.: US 6,928,175 B1
(45) Date of Patent: *Aug. 9, 2005

(54) AUDIO SYSTEM WITH OPTIONAL AUTO-SWITCHING SECONDARY CONNECTOR, AND METHOD FOR SAME

(75) Inventors: Carl Bader, Downingtown, PA (US); John DeHelian, Red Hill, PA (US)

(73) Assignee: Creative Technology Ltd., Singapore (SG)

( * ) Notice: Subject to any disclaimer, the term of this patent is extended or adjusted under 35 U.S.C. 154(b) by 730 days.

This patent is subject to a terminal disclaimer.

(21) Appl. No.: 09/594,524

(22) Filed: Jun. 14, 2000

(51) Int. Cl.[7] .......................... H02B 1/00; H01R 29/00; H01R 4/26
(52) U.S. Cl. .................. 381/123; 439/188; 439/441
(58) Field of Search .................. 381/123; 439/188, 439/441

(56) References Cited

U.S. PATENT DOCUMENTS 5,666,267 A * 9/1997 Carter et al. ................ 361/686
5,788,509 A * 8/1998 Byers et al. ................. 439/61
6,069,960 A * 5/2000 Mizukami et al. ............ 381/74
6,219,732 B1 * 4/2001 Henrie et al. ............... 710/301
6,491,533 B2 * 12/2002 Costello et al. ............. 439/188

* cited by examiner

Primary Examiner—Sinh Tran
Assistant Examiner—Devona E Faulk
(74) Attorney, Agent, or Firm—Russell N. Swerdon; P. Francois de Villiers

(57) ABSTRACT

An audio system and circuit are disclosed that are operable in either a first configuration and a second configuration. The first configuration includes sound processing circuitry, a primary connector, and a header. The second configuration adds an optional secondary connector to the header. The system and circuit mutes or turns off the audio signal at the primary connector and the main output contacts (if any) upon insertion of a plug into the secondary connector in the second configuration. The system and circuit also optionally mutes or turns off the audio signal at a main output contact upon insertion of a plug into the primary connector in each of the first and second configurations. The system may also employ logic switches or FETs to interrupt the audio signal upon insertion of a plug into the secondary connector. The system uses a simple switchless interconnection between the secondary circuit and the main system.

43 Claims, 9 Drawing Sheets

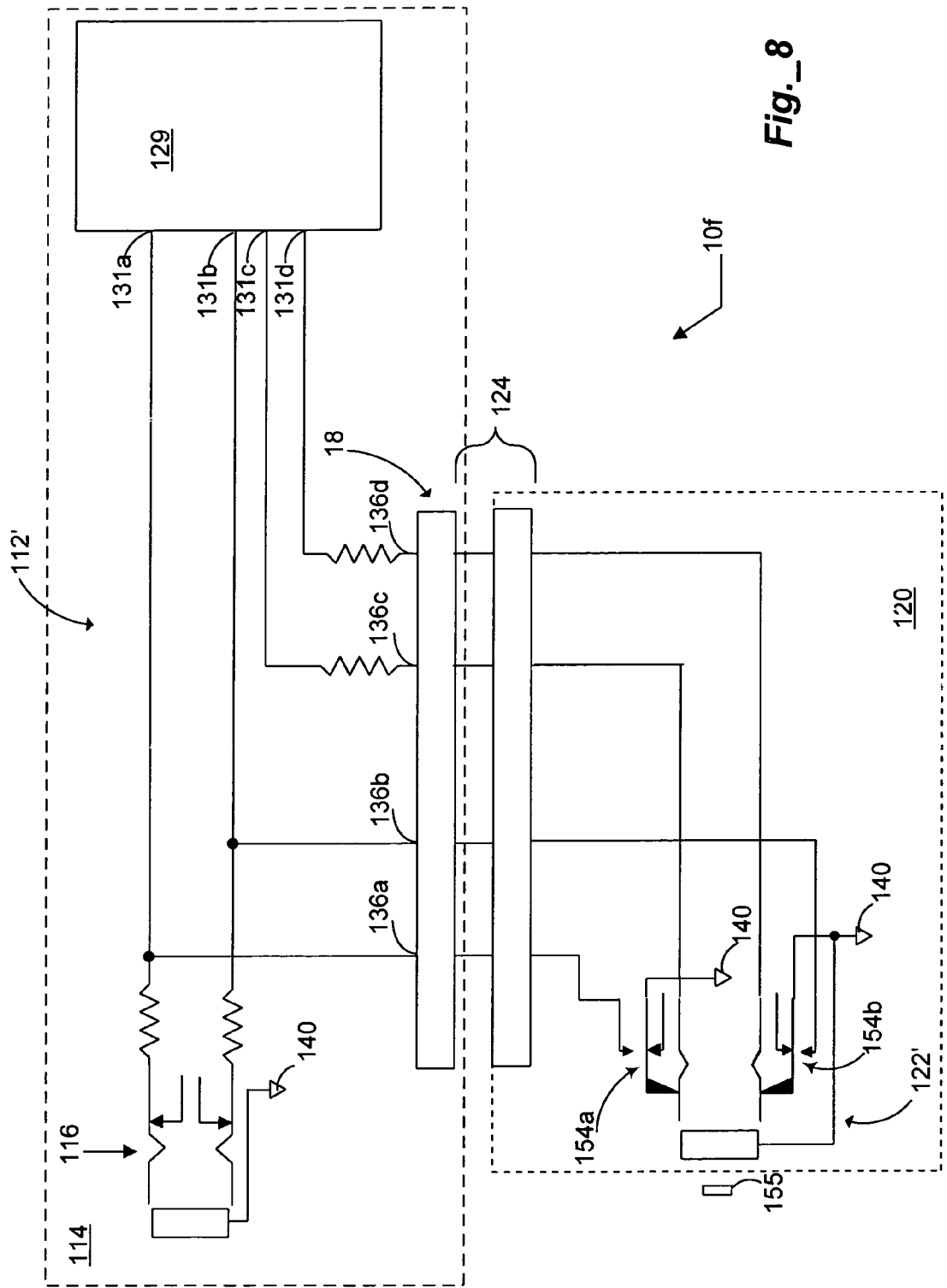

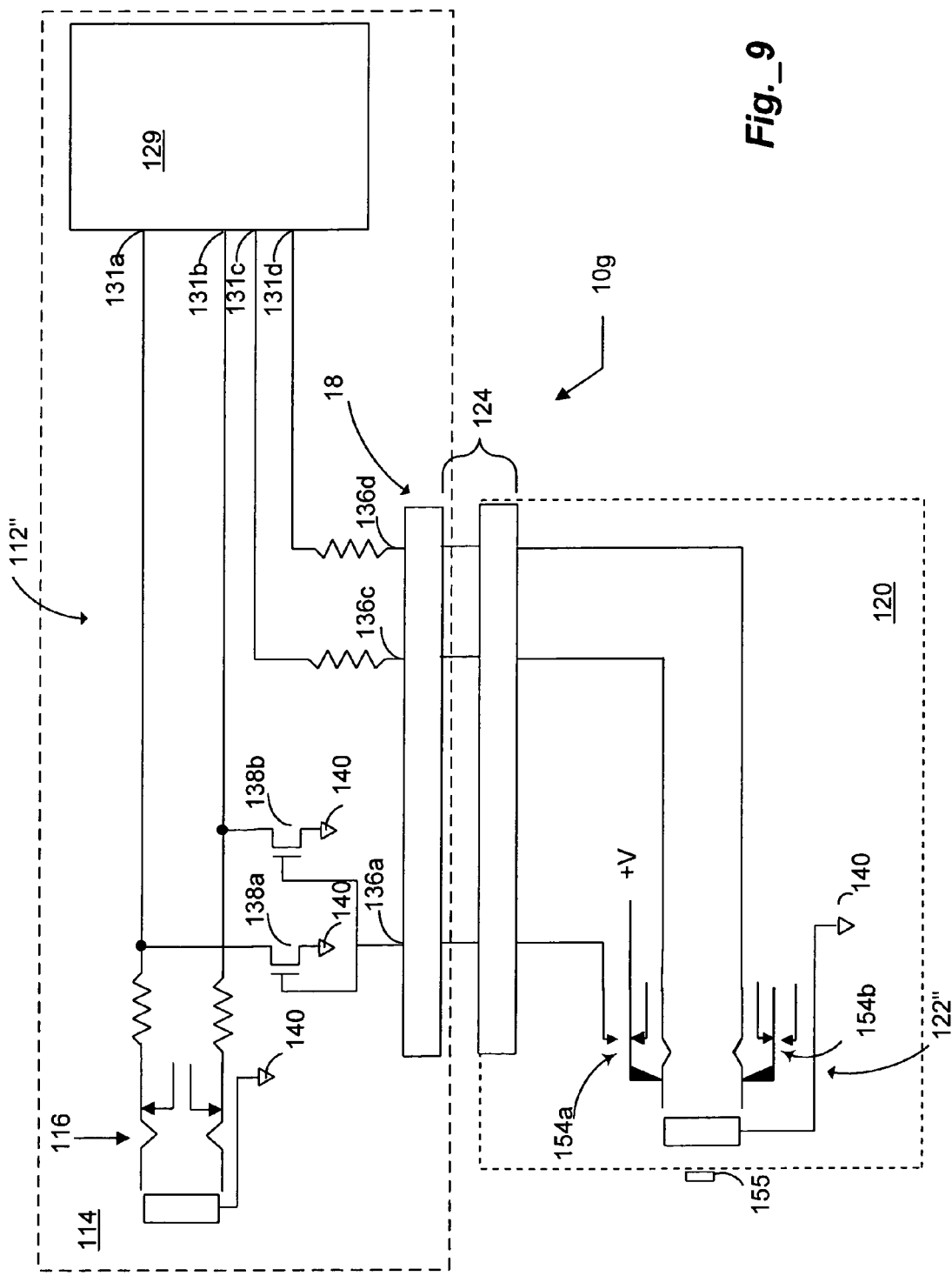
Fig._9

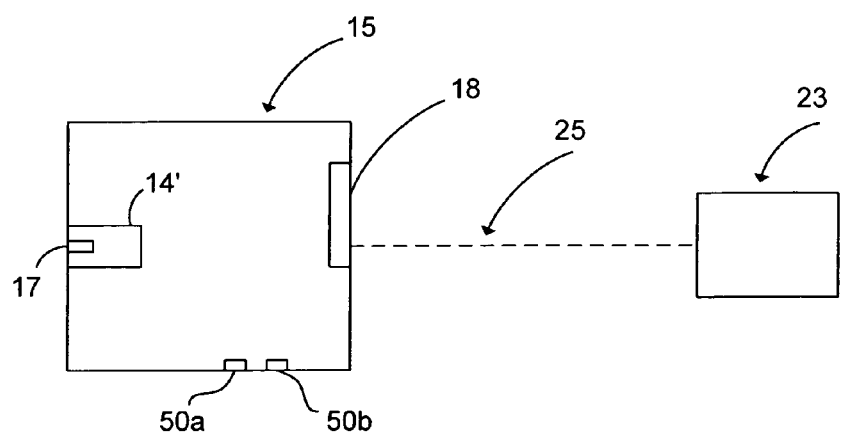
Fig._10

AUDIO SYSTEM WITH OPTIONAL AUTO-SWITCHING SECONDARY CONNECTOR, AND METHOD FOR SAME

BACKGROUND

This invention relates to computer and electronic components and, more particularly, to sound card circuit configurations and related components for generating or processing audio signals.

Sound cards are add-on boards that are employed within a personal computer or related device to produce or process audio signals to enhance sound quality, or for enabling sound capabilities, of the computer. Sound cards may, for example, produce or enhance a signal representing sounds corresponding to a prompt or like sound from an ordinary computer program, sounds for video games played on the computer, and downloadable music or sounds such as, for example, in an MPEG Audio Layer standard. Conventional sound cards may also be capable of capturing and processing signals from musical instruments.

The circuitry of a conventional sound card may include audio subsystems for digital audio capture and replay and music synthesis, including by an internal FM synthesizer and by playing a digitized or sampled sound. A matched pair of digital-to-analogue (DAC) and analogue-to-digital (ADC) converters coupled with a programmable sample rate generator may be provided to process digital audio.

In addition to an interface with the computer bus, sound cards typically provide an interface to a player that is capable of playing music and/or video, such as compact discs and digital video disks, which will be referred to herein as CD-ROMS. They also support proprietary interfaces for the CD-ROM player, as well as standard interfaces such as SCSI and IDE/EIDE and like standards. Thus, a sound card may process signals from CD-ROMS or other play-back equipment, downloaded or stored files (including telephone answering machine files), musical instruments, and the like.

Several connectors may be part of a sound card to provide digital or analog connections thereto. Such connectors include one or more microphone-in connector, line-in and line-out connector, loudspeaker-out connector, musical instrument digital interface ("midi") port, joystick port, cd audio-in or similar connector, auxiliary-in connector, telephone answering device in connector, digital out connector, optical or coaxial digital I/O card connector, headphone out connector, and the like.

Some of the connectors may be accessible from outside of the computer. Specifically, the headphone connector or headphone jack typically protrudes through or is accessible through an aperture in the sound card bracket, which encloses the expansion slot. The sound card circuitry may be configured such that the audio signal to the loudspeaker output connector(s) is muted in response to inserting a headphone plug into the headphone connector. In such a configuration, in which the audio signal is audible through loudspeakers electrically connected to the loudspeaker output connector, plugging the headphone plug into the headphone connector mutes the sound emitted from the loudspeakers in favor of providing the audio signal to the headphones.

Some computer manufacturers have placed a headphone jack (or a microphone jack) at a location that is convenient to the user, such as the computer front panel. To connect it to the audio signal, the front headphone jack may be connected to the sound card. Merely connecting the front headphone jack in parallel with the rear headphone jack would make it difficult or impossible to mute the audio signal in response to insertion of the front headphone connector into the front headphone jack while retaining the auto-mute function of the primary headphone connector. On the other hand, connecting the front headphone jack to a normally-open front connector on the sound card in series with the rear headphone connector has the disadvantage that the signal must be transmitted to the front of the computer and back to the sound card, even during operation with the rear headphone jack or the loudspeakers. Further, because not all computer manufacturers employ a front headphone jack in addition to the rear headphone jack, sound card manufacturers must produce two versions of the same sound card, and computer manufacturers and sound card re-sellers and retailers would be required keep two versions of each sound card in stock—one conventional sound card for use with computers employing only a single (that is, rear) headphone jack and another for use with computers employing both a rear and front headphone connector.

SUMMARY

An audio system is provided that includes a main audio system and a secondary system that is remote relative to the main audio system. The main audio system may be operative alone (that is, without the secondary system) or with the secondary system connected to the main audio system. The audio system of the present invention may include one of an audio circuit, a sound source, and an input audio device, as well as a primary connector, and a switchless connector header, and may be employed where the secondary system includes a secondary connector and a normally open switch such that the switch operates in response to insertion of a secondary plug into said secondary connector to mute or turn off the primary connector.

For the output connector embodiments, the main audio system encompasses any sound source, a connector header to which the optional secondary system may be connected, and an output connection that may include a primary connector or a main output contact, and/or like device. The secondary connector enables auto muting of at least a portion of the main audio system in response to connecting a secondary plug into the secondary system. For the input connector embodiments, the main audio system encompasses any audio input device, a connector header to which the optional secondary system may be connected, and an input connection that may include a primary input connector and/or like device. The secondary connector enables auto switching to turn off at least a portion of the main audio system in response to connecting a secondary plug into the secondary system.

The invention encompasses circuits and hardware systems, as well as methods corresponding to the same. The audio circuit and system of the particular embodiments summarized below encompass a single channel or multiple channel circuits and systems. Preferably, the primary connectors in each of the output connector embodiments is a headphone jack, and in each of the input connector embodiments is a microphone jack, that is accessible from a rear of a computer and the secondary connector is a secondary headphone jack or microphone jack, respectively that is accessible from a front of the computer.

According to a first embodiment of the present invention, an audio circuit is provided that is operable in each one of a first configuration and a second configuration. The first configuration of the audio circuit includes a sound source having an output for producing an audio signal, a primary connector that is electrically coupled to the sound source output to receive the audio signal, and a connector header. The connector header comprises a first contact electrically coupled to the audio circuit output, a second contact electrically coupled to the primary connector, and a ground contact that is electrically coupled to a ground. Each one of the header first contact and the second contact are ungrounded.

The secondary configuration includes a secondary connector circuit comprising a secondary connector first contact electrically coupled to the header first contact, a normally-open secondary connector second contact electrically coupled to the header second contact, and a normally-open switch electrically coupled to the header ground contact. The switch is operable to electrically couple the header second contact to the header ground contact to short the primary connector to the ground while the switch is in its closed position. The first configuration does not include the secondary connector circuit, and thus the audio circuit optionally includes the secondary connector circuit.

In the first particular embodiment, a first op-amp is coupled to the sound source, and the header and the primary connector are coupled to the output of the first op-amp. In a second particular embodiment, a second op-amp is coupled the sound source such that the first op-amp is coupled in parallel with the second op-amp and primary connector. Preferably, the first op-amp, the first resistor, and a first contact of the header are electrically coupled together in series, and a second op-amp, a second resistor, and a portion of the primary connector are electrically coupled together in series.

According to a third particular embodiment of the present invention, an audio circuit is provided that includes a connector header, a primary connector, and a normally closed first primary switch in a first configuration, and optionally also includes a secondary connector circuit in a second configuration. The audio circuit of the third embodiment is operable in each one of the first configuration that does not include the secondary circuit and a second configuration that includes the secondary circuit.

In the third embodiment, the connector header includes a first contact electrically coupled to the audio circuit output, a second contact electrically coupled to a control voltage, a ground contact that is electrically coupled to a ground. Each one of the header first contact the second contact are ungrounded. The primary connector is electrically coupled to the audio circuit output in parallel with the connector header first contact to receive the audio signal. The first primary switch is electrically coupled between the audio circuit output and the primary connector, and is electrically coupled to the control voltage for operation thereby to switch the audio signal to the primary connector.

The secondary connector circuit comprises a secondary connector first contact that is electrically coupled to the header first contact, a normally-open secondary connector second contact that is electrically coupled to the header second contact, and a secondary switch that is electrically coupled to the header ground contact. The secondary switch is operable to electrically couple the header second contact to the header ground contact to short the control voltage to the ground while the secondary switch is in its closed position, thereby muting the audio signal at the primary connector.

The present invention encompasses the hardware system in addition to the circuit described above. In a first particular embodiment of the dual-configuration audio system, the audio system is operable in each one of a first configuration and a second configuration. The first configuration comprises a printed circuit board having a sound source mounted thereon for providing the audio signal, a connector header having plural contacts therein and coupled to the printed circuit board and being in electrical communication with the sound source such that the audio signal is coupled to the header, and a primary connector (which may be auto-muting) including a primary socket coupled to the printed circuit board for removably receiving a primary plug, the primary connector receiving the audio signal.

The second configuration comprises the printed circuit board, the header, and the primary connector, and further comprises a secondary connector including a secondary socket being spaced apart from the printed circuit board for removably receiving a secondary plug, and a wiring harness having a wiring harness plug that is insertable into the header. The wiring harness is electrically coupling the secondary connector to the header such that the secondary connector receives the audio signal. The audio signal is muted at the primary connector in response to insertion of the secondary plug into the secondary connector in the second configuration. In the first embodiment, the primary connector is shorted to a ground in response to insertion of the secondary plug into the secondary connector, thereby muting the audio signal at the primary connector.

In the first embodiment of the hardware system, a first op-amp and resistor is connected to the header, and the primary connector is connected to the output of the first op-amp. In a second particular embodiment, a second op-amp and resistor are connected to the header in parallel with the first-op-amp and resistor, such that each of the first op-amp and second op-amp electrically coupled to the sound source, the first op-amp and the first resistor are electrically coupled between the sound source and a header first contact, the second resistor is electrically coupled between the second op-amp and each of a header second contact and the primary connector. The header second contact and the primary connector are coupled in parallel relative to the second connector.

In a third particular embodiment of the hardware system, the dual-configuration audio system comprises a printed circuit board, a connector header, a primary connector, and a normally open first primary switch in a first configuration. The audio system optionally includes a secondary connector, and the audio system is operable in each one of the first configuration that does not include the secondary connector and a second configuration that includes the secondary connector.

In the third embodiment, the printed circuit board has a sound source that provides an audio signal and that is mounted thereon. The connector header comprises a first contact pin electrically coupled to the sound source, a second contact pin electrically coupled to a control voltage source, and a ground contact pin that is electrically coupled to a ground. Each one of the header first contact pin the second contact is ungrounded. The primary connector (which may be auto-muting) is electrically coupled to the sound source in parallel with the connector header first contact pin to receive the audio signal. The first primary switch is electrically coupled between the sound source and the primary connector, and is electrically coupled to the control voltage source for operation thereby to switch the audio signal to the primary connector.

The optional secondary connector of the third embodiment includes a secondary connector first contact that is electrically coupled to the header first contact, a normally-open secondary connector contact that is electrically coupled to the header second contact, and a secondary switch that is electrically coupled to the header ground contact pin. The secondary switch is operable to electrically couple the header second contact to the header ground contact to short the control voltage to the ground, thereby opening the switch to mute the audio signal at the primary connector.

According to other embodiments of the present invention, an audio circuit is provided that comprises an audio input device, a primary connector, and a switchless connector header. The audio circuit optionally includes a secondary connector circuit comprising a secondary connector and a normally open switch such that the switch operates in response to insertion of a secondary plug into said secondary connector to mute or turn off said primary connector. The audio circuit is preferably an audio input device for receiving an audio signal. The audio input device may be a codec (or related component or connector thereto) in some embodiments such that the primary connector is a condenser microphone or a dynamic microphone. Also, the audio input device may be a more complex, multi-channel component such that the primary connector may be a line level signal connector for connecting a line in thereto. These embodiments may employ direct grounding of the primary connector signals via switching in the secondary connector (or related circuit) via the switchless header, or may employ grounding of the primary connector signals by active switching, such as by switching a control voltage in the secondary connector (or related circuit) via the switchless header to close a switch between the primary connector signal and a ground thereby.

A method is provided for optionally coupling a secondary connector to a sound card that is operable for processing an audio signal either without the secondary connector or with the secondary connector coupled thereto. The method comprises the steps of providing a sound card for producing an audio signal and optionally coupling a secondary connector to the sound card. In the first step, the sound card includes a connector header and an auto-muting primary connector. The header has at least three electrically spaced-apart contacts disposed therein: a first one of the three header contacts receives the audio signal, a second one of the three header contacts is electrically coupled to the primary connector, and a third one of the three header contacts is electrically coupled to a ground.

The secondary connector is coupled to the sound card via the header such that a switch in the secondary connector shorts the third header contact to the second header contact to mute the audio signal at the primary connector. The first header contact provides the audio signal to the secondary header.

Another embodiment of the method according to the present invention comprises the steps of providing a sound source and optionally coupling a secondary connector to said sound source. The providing step includes providing the sound source for producing an audio signal, the sound card including a connector header, a normally open first primary switch, and a primary connector. The header has three electrically spaced-apart contacts disposed therein: a first one of the three header contacts receives the audio signal, a second one of the three header contacts is electrically coupled to the first primary switch and to a control voltage, and a third one of the three header contacts is electrically coupled to aground.

The secondary connector is coupled to the sound source via the header such that a switch in the secondary connector shorts the third header contact to the second header contact such that the control voltage is coupled to the ground, thereby opening the first primary switch to mute the audio signal at the primary connector, the first header contact providing the audio signal to the secondary header. Corresponding methods relating to the input-related embodiments are also provided.

BRIEF DESCRIPTION OF THE DRAWINGS

FIG. 8 is a schematic showing a circuit according to a sixth embodiment of the present invention;

FIG. 9 a schematic showing a circuit according to a seventh embodiment of the present invention;

FIG. 10 is a schematic illustrating alternative embodiments of the present invention.

DESCRIPTION OF PREFERRED EMBODIMENTS

Each of the embodiments of the sound card system of the present invention are operable in each one of a first configuration and a second configuration. Even though components and their arrangements may vary among the embodiments described below, the first configuration generally includes circuitry for processing an audio signal and a primary connector for receiving a primary headphone plug. The first configuration may also include a connector header. The second configuration includes a wiring harness that is capable of being inserted into the connector header and a secondary connector for receiving a secondary plug.

Figure 1:
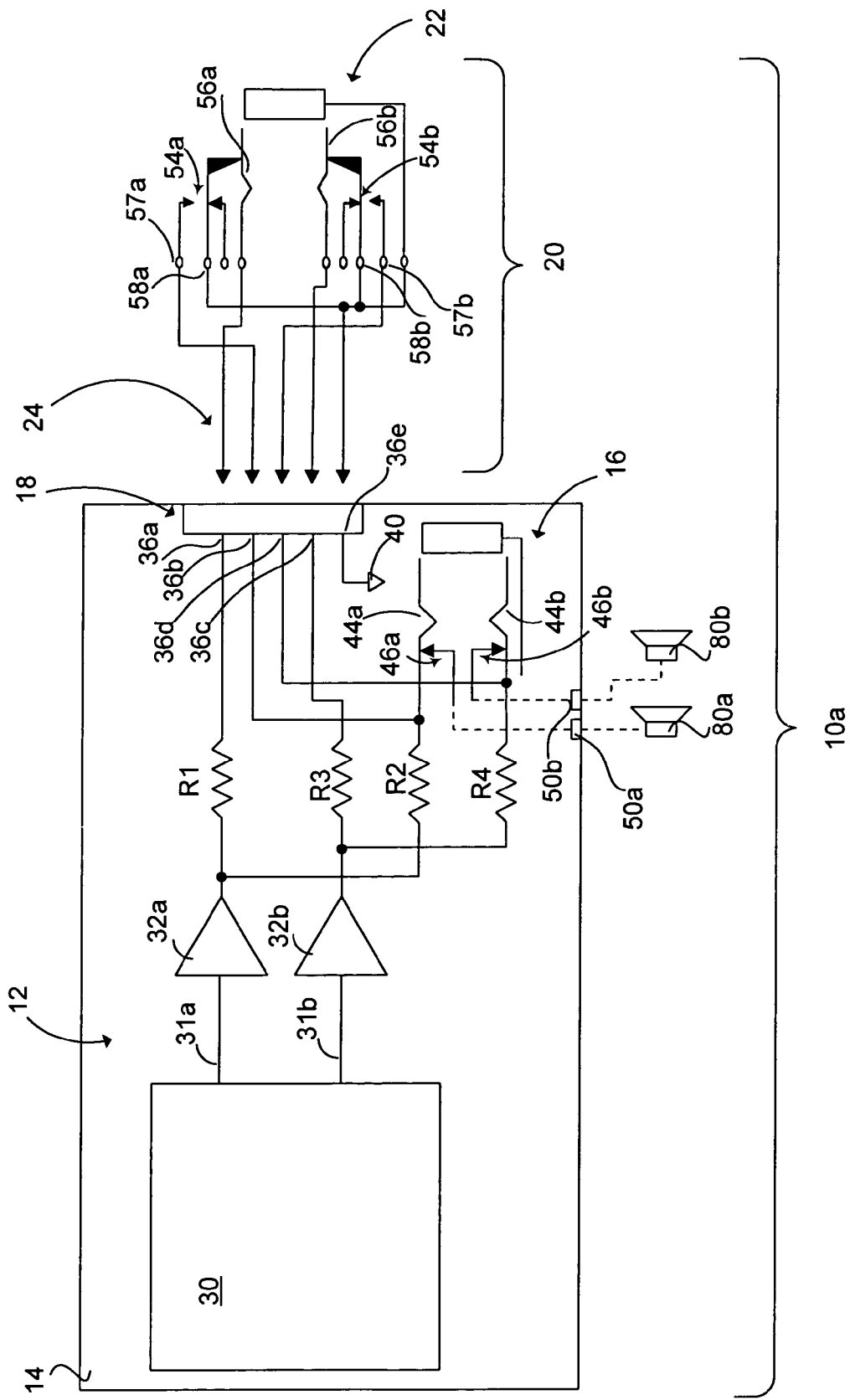
FIG. 1 is a schematic showing a circuit according to a first embodiment of the present invention.
Figure 4:
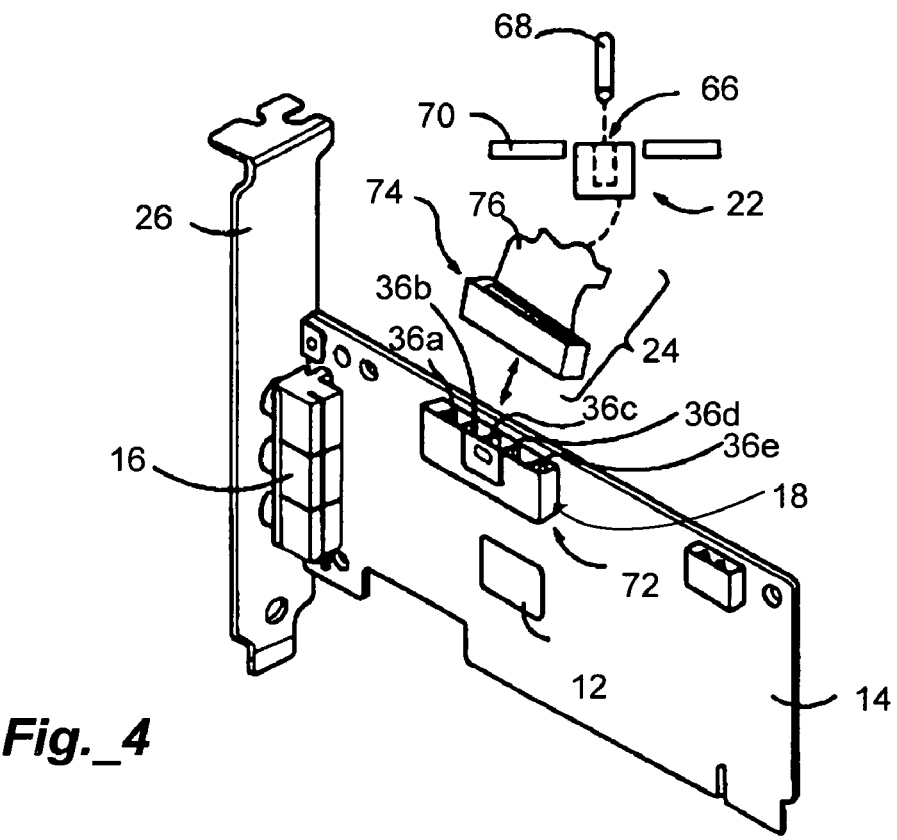
FIG. 4 is a front perspective view of a sound card according to the present invention.
Figure 5:
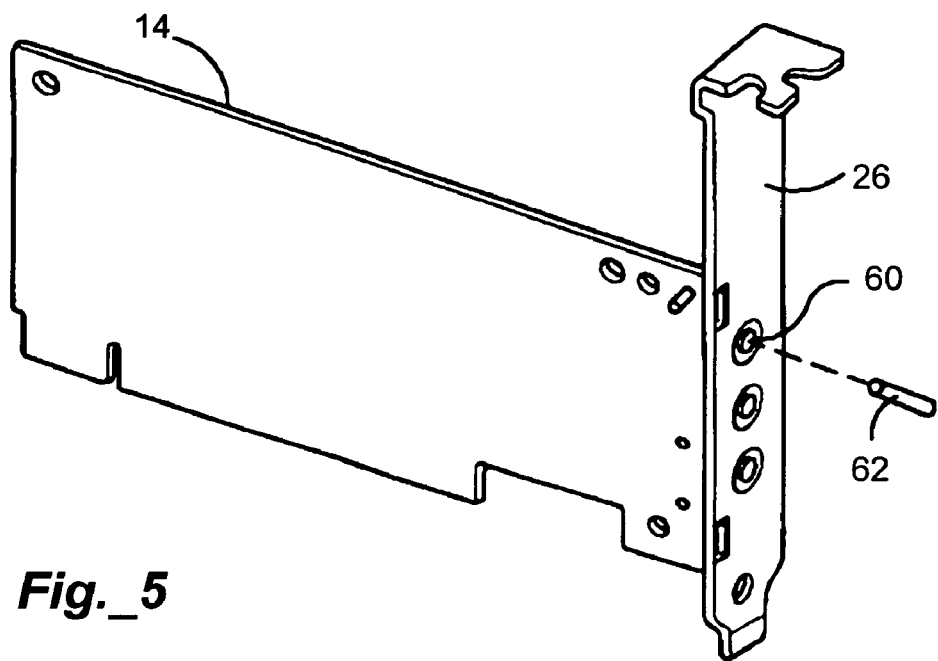
FIG. 5 is a rear perspective view of the sound card shown in FIG. 4.

Referring to FIGS. 1, 4, and 5 to illustrate a first embodiment of the present invention, a sound card system 10a includes a sound source, such as sound processing circuit 12 and related components, a printed circuit board (PCB) 14, a primary connector 16, a connector header 18, and, optionally, a secondary connector assembly 20, which includes a secondary connector 22 and a wiring harness 24. The configuration essentially comprising the processing circuit 12, primary connector 16, and connector header 18, and which omits the secondary connector 22, is referred to herein as the first configuration. The configuration that comprises the elements of the first configuration as well as the secondary connector 22 and wiring harness 24 is referred to herein as the second configuration.

PCB 14 may be referred to as the main circuit board, which may encompass a motherboard of a computer, a sound card, and similar components, as will be understood by persons familiar with audio processing. PCB 14 is illustrated in FIGS. 4 and 5 as a half-height add-on board for a personal computer, although the present invention encompasses boards of any geometry employed in any computing device or audio system. PCB 14 is mounted on to bracket 26 that may cover the computer expansion slot, which typically is disposed at the rear of a personal computer box. Other common features of a printed circuit board, such as, for example, conventional male and female connectors, signal lines, and the like, are omitted from FIGS. 4 and 5 for clarity. Although components of the present invention are described as mechanically affixed (that is, directly mounted via conventional methods, such as for example surface mounting) on PCB 14, the present invention encompasses a design in which some of the components (in addition to secondary connector 22) are not disposed on PCB 14.

The present invention encompasses employing any sound source, including a sound processing circuit (which may include a codec) of a sound card and any other conventional source, as well as any of a digital signal processing (DSP) device, a modem, a television signal, an audio tuner or receiver, a tape or disc player (such as a digital audio tape (DAT) or a compact disc), and like devices, including corresponding circuitry, or even merely a connector that receives an audio signal from any other source.

To illustrate the present invention, the figures show the sound processing circuit 12 that employs conventional circuitry to generally process any audio signal, such as (for example) in compliance with SoundBlaster (TM) and general MIDI standards. An exemplary coder/decoder module 30 illustrates a portion of the sound processing circuit, and is shown with a first or left output 31a and a second or right output 31b of sound processing circuit 12. Codec 30 is mounted to the printed circuit board 14 by any conventional method, such as surface mounting. As will be understood by persons generally familiar with conventional audio system technology, numerous conventional devices may be employ instead of or to compliment codec 30.

The embodiments described herein employ operational amplifiers and resistors that may be considered to be encompassed within a sound processing circuit of a sound card, but are described separately herein to more clearly illustrate aspects of the present invention. In this regard, a first or left op-amp 32a and a second or right op-amp 32b are mounted onto PCB 14 and electrically connected to the left and right channels, respectively, of the output of codec 30. Resistors R1 and R3 are also mounted onto PCB 14 and electrically coupled to the output sides of op-amps 32a and 32b, respectively.

Primary connector 16 includes a primary socket 60 formed therein for receiving a primary plug 62, as shown in FIGS. 4 and 5, which illustrate a front and rear perspective view of the PCB with a portion of some of the assembled components of each embodiment. Primary connector 16 preferably is mounted to PCB 14 and protrudes through mounting bracket 26 so as to provide access to primary plug 62. Primary connector 16 includes a first or left contact 44a and a second or right contact 44b for receiving the left and right channels of the audio signal. Further, primary connector 16 includes a first or left switch 46a and a second or right switch 46b.

Switches 46a and 46b, which are shown schematically in FIG. 1, provide a conventional auto-muting function to primary connector 16 such that insertion of primary plug 62 into primary socket 60 opens the circuit to a pair of main output contacts 50a and 50b, respectively, thereby muting the audio signal to main output contacts 50a and 50b. Preferably, main output contacts 50a and 50b may be, for example, connectors for loudspeakers or other audio outputs. Preferably, primary connector 16 is a conventional headphone jack and plug 62 is a corresponding headphone plug.

Connector header 18 is a conventional switchless header that is mounted to PCB 14. Referring particularly to FIGS. 1 and 4, header 18 includes a non-conductive header body 72 within which are plural contacts or pins, which include first pin 36a, second pin 36b, third pin 36c, fourth pin 36d, and fifth pin 36e. Each of the pins 36a through 36e are mutually electrically isolated within header 18 (that is, each pin is electrically isolated from each other pin).

As shown in FIG. 1, first pin 36a is electrically connected to the output of left op-amp 32a and first resistor R1 to receive the left audio signal. Second pin 36b is electrically coupled to left contact 44a of primary connector 16. Third pin 36c is electrically connected to the output of right op-amp 32b and third resistor R3 to receive the right audio signal. Fourth pin 36d is electrically coupled to right contact 44b of primary connector 16. The second and fourth pins 36b and 36d are connected to the primary connector such that pins 36b and 36d receive the left audio signal and right audio from primary contact 44a and 44b even if switches 46a and 46b are open to mute the audio signal at main contact 50a and 50b. Fifth pin 36e is coupled to a ground 40.

Wiring harness 24 includes a wiring harness plug 74 that is capable of being inserted into connector header 18, and includes wiring to electrically couple secondary connector 22 to header 18. The wiring of harness 24 is shown schematically as a ribbon 76 in FIG. 4, although any type of suitable connecting wires may be employed, as will be understood by persons familiar with wiring technology.

Secondary connector 22 includes a secondary socket 66 formed therein for receiving a secondary plug 68. Typically, secondary connector 22 is provided proximate the front of a personal computer box, which shown schematically as reference numeral 76 in FIG. 4, or similar conveniently accessible location for easy assess thereto by a user. Thus, secondary connector 22 preferably is spaced apart from PCB 14. Preferably secondary connector 22 is a conventional headphone jack and plug 68 is a corresponding headphone plug.

Secondary connector 22 includes a first or left contact 56a and a second or right contact 56b for receiving the left and right channels of the audio signal. Further, secondary connector 22 includes a first or left switch 54a and a second or right switch 54b. Left switch 54a has a first pole 57a and second pole 58a. Right switch 54b has a first pole 57b and a second pole 58b.

Preferably, each switch 54a and 54b is normally open such that left first pole 57a is electrically isolated from left second pole 58a and such that right first pole 57b is electrically isolated from right second pole 58b. Further, left and right second poles 58a and 58b are coupled together. Secondary connector 22 is of the type that changes the position of the switches upon insertion of an appropriate plug into secondary socket 66. Specifically, switches 54a and 54b will move from the open position shown in FIG. 1 to the closed position in which the circuit between poles 57a and 58a, and 57b and 58b, are closed (not shown in the Figures) upon insertion of the plug into the socket.

Referring particularly to FIG. 1 to describe the operation of the circuit of the first embodiment of the present invention, sound card system 10a is operable in a first configuration that includes circuit 12, primary connector 16, and connector header 18, and omits the secondary connector. In the first configuration, the audio signal from the circuit left output 31a passes through op-amp 32a and second resistor R2. While there is no plug inserted into primary connector socket 60, primary switch 46a is closed such that the left main output contact 50a receives the left audio signal. Likewise, the circuit right output 31b passes through op-amp 32b and fourth resistor R4, and while no plug is inserted into primary socket 60, the right audio signal passes through closed primary switch 46b to right main output contact 50b.

Because loudspeakers 80a and 80b may be connected to the main output contacts 50a and 50b, respectively, the loudspeakers 80a and 80b may audibly produce sounds that represent the left and right audio signals. Loudspeakers 80a and 80b are shown in FIG. 1, and are omitted from FIGS. 2 and 3 for clarity. The dashed lines of FIGS. 1–3 between primary connector 16 and main output contacts 50a and 50b are shown in indicate that the present invention contemplates employing any conventional components therein. For the embodiment shown in FIG. 1, any components common to sound cards may be employed, including an on-board application as will be understood by persons familiar with conventional sound card technology.

Upon insertion of primary plug 62 into primary socket 60, left primary switch 46a and right primary switch 46b open to break the circuit with respect to main output contacts 50a and 50b, respectively, thereby muting the signal at contacts 50a and 50b. Because portions of the primary plug are electrically coupled primary contacts 44a and 44b, primary headphones (not shown) coupled to primary plug 62 receive the left and right audio signals. Each one of pins 36a through 36d are at the end of an open circuit, and therefore do not affect the audio signals in the first configuration.

Sound card system 10a is operable in a second configuration that comprises the components of the first configuration as well as secondary connector 22. In the second configuration, wiring harness plug 74 is inserted into header 18, thereby electrically coupling secondary connector left contact 56a with first pin 36a, secondary connector right contact 56b with third pin 36c, left switch first pole 57a with second pin 36b, right switch second pole 57b with fourth pin 36d, and each one of left second pole 58a and right second pole 58b with ground pin 36e. While there is no secondary plug inserted into secondary socket 66, the circuit operates as described with respect to the first configuration because switches 54a and 54b are normally open, and the secondary connector contacts 56a and 56b and first poles 57a an 57b are electrically isolated from grounded poles 58a and 58b.

Upon insertion of secondary plug 66 into secondary socket 66, secondary left switch 54a closes to electrically couple left first pole 57a and left second pole 58a together. Thus, primary connector left contact 44a is shorted to ground 40 via header second pin 36b, poles 57a and 58a of switch 54a, and ground pin 36e. Likewise, insertion of secondary plug 66 into secondary socket 66 closes right switch 54b, which electrically couples right poles 57b and 58b together to short primary connector right contact 44b to ground 40 via header fourth pin 36d, poles 57b and 58b of switch 54b, and ground pin 36e. Because the audio signal at the primary connector 16 is shorted to ground in response to insertion of secondary plug 68 being inserted into secondary connector 22, the audio signal is muted at each one of the primary connector 16 and the main output contacts 50a and 50b.

Figure 2:
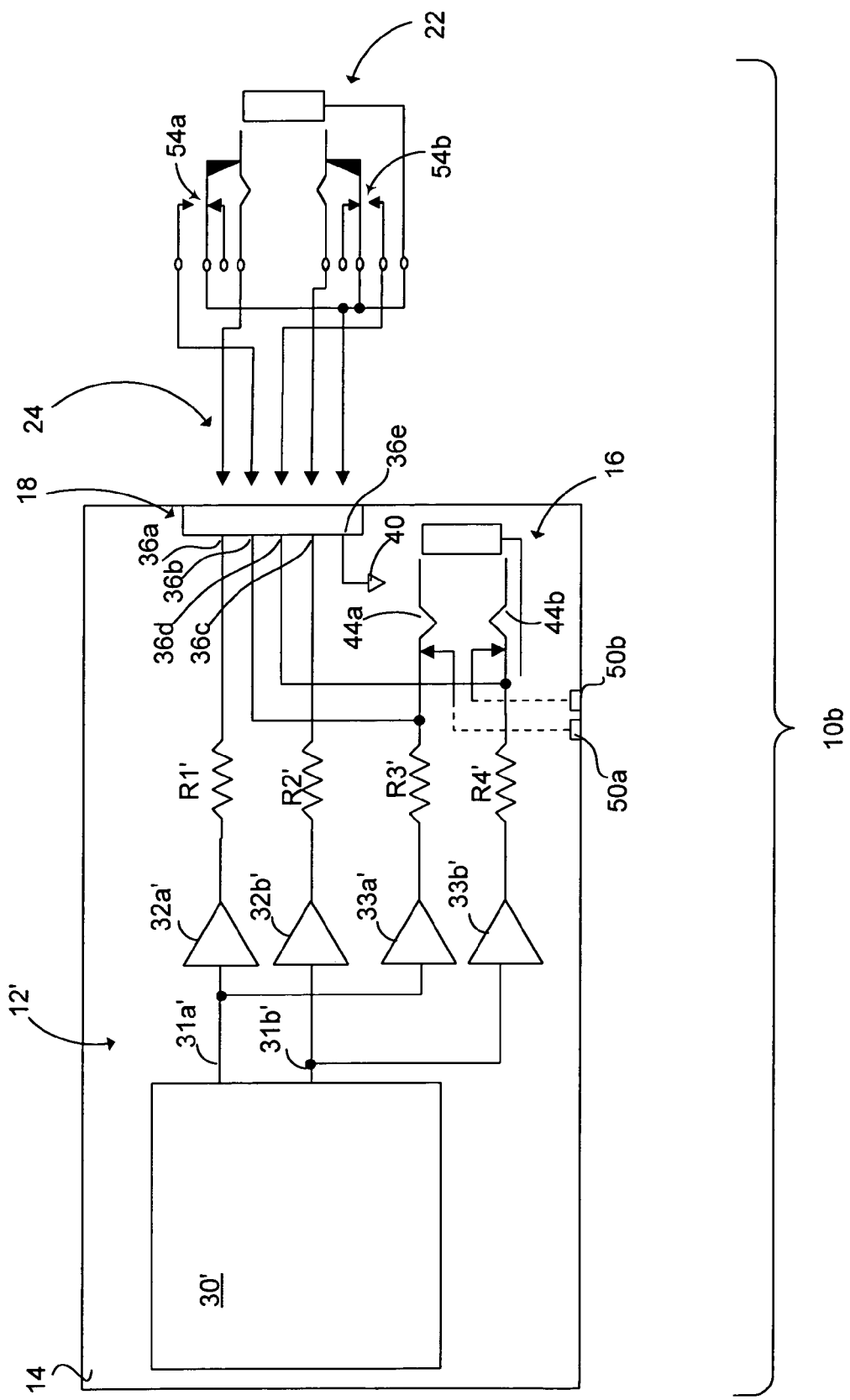
FIG. 2 is a schematic showing a circuit according to a second embodiment of the present invention.

Referring to FIG. 2 to illustrate a second embodiment of the present invention, sound card system 10b includes some components that individually are the same as those described with respect to the first embodiment 10a, including primary connector 16, header 18, and secondary connector 22. The interconnections among the components in the second embodiment is different than those of the first embodiment. A single prime (') designation will be employed to refer to components or elements of the second embodiment 10b that correspond to similarly situated components or elements of the first embodiment 10a, or for convenience and consistency. However, the features or characteristics of the components bearing the single prime designation may be different from those described with respect to the first embodiment.

In addition to a first left op-amp 32a' and a first right op-amp 32b', sound card system 10b includes a second left op-amp 33a' and a second right op-amp 33b'. Each one of first left op-amp 32a' and second left op-amp 33a' is electrically coupled to the processing circuit left output 31a'. Resistors R1' and R3' are electrically coupled to the outputs of first and second left op-amps 32a' and 33a', respectively. First left op-amp 32a' and resistor R1' are electrically coupled to header first pin 36a'. Second left op-amp 33a' and resistor R3' are electrically coupled to header second pin 36b' and primary connector left contact 44a.

Each one of the first right op-amp 32b' and the second right op-amp 33b' is electrically coupled to the processing circuit right output 31b'. Resistors R2' and R4' are electrically coupled to the outputs of the first and second right op-amps 32b' and 33b', respectively. First right op-amp 32b' and resistor R2' are electrically coupled to header third pin 36c'. Second right op-amp 33b' and resistor R4' are electrically coupled to header fourth contact 36d' and primary connector right contact 44b.

The second pair of op-amps 33a' and 33b' enable the first pair of op-amps 32a' and 32b to be dedicated to the secondary output such that the integrity of the audio signal at secondary connector contacts 56a and 56b is preserved when the audio signal at the primary connector contacts 44a and 44b is shorted to ground in response to insertion of secondary plug 68 into secondary connector 22. Specifically, upon insertion of secondary plug 68 into secondary socket 66, primary contacts 44a and 44b are shorted to ground 40 as described with respect to the first embodiment 10a.

Thus, the line from the first pair of op-amps is undisturbed from the output of first op-amps 32a and 32b to the secondary connector contacts 56a and 56b, respectively, because the audio signal that is provided to the primary connector from the separate pair of (second) op-amps 33a' and 33b' receives the signal from the processing circuit output 31a and 31b, rather than from the output of first op-amps 32a' and 32b'. Therefore, upon shorting of the audio signal at the primary connector contacts 44a and 44b, the integrity of the audio signal provided by the first op-amps 32a' and 32b' to the secondary connector contacts 56a and 56b is essentially undisturbed.

Figure 3:
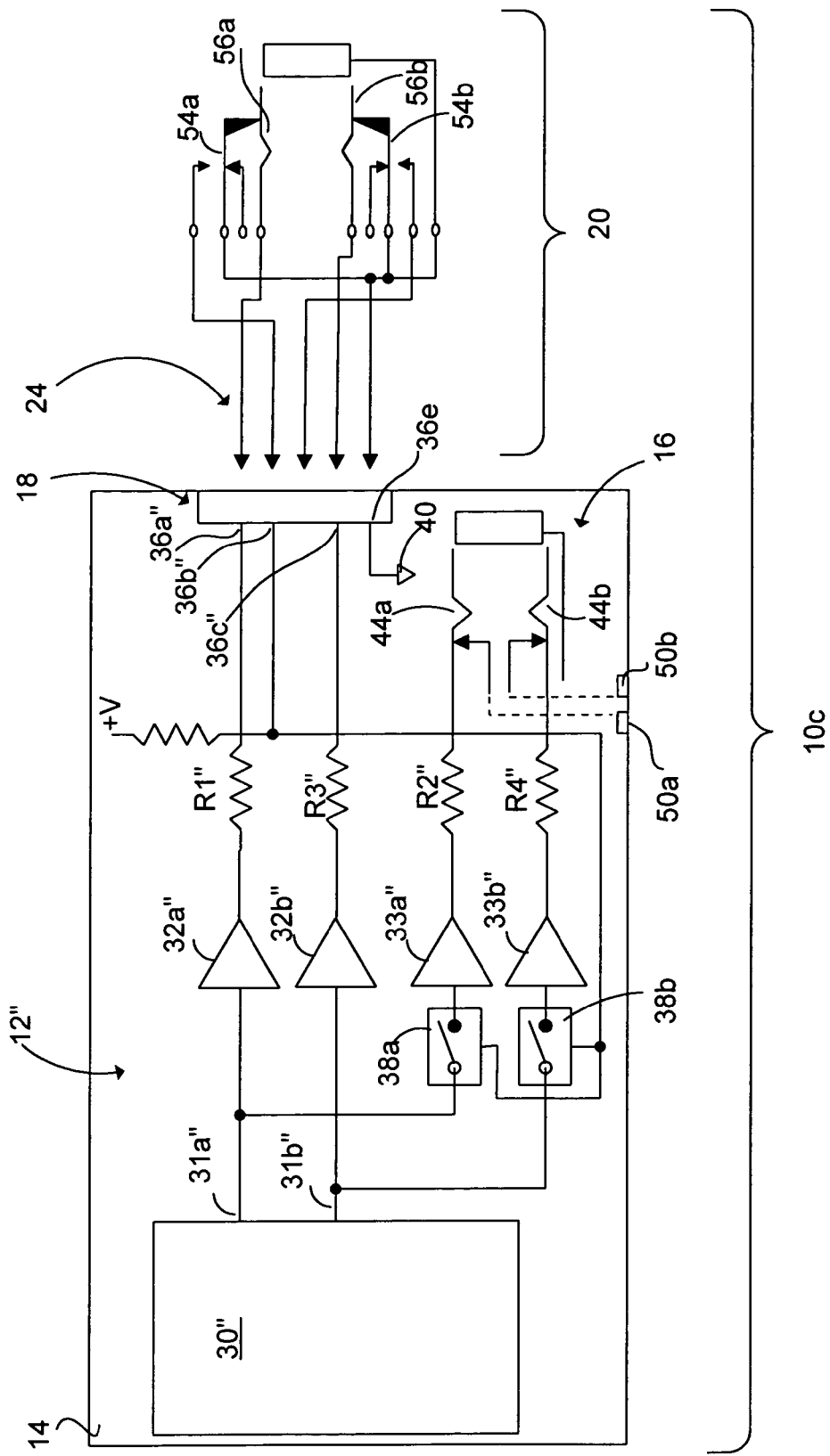
FIG. 3 is a schematic showing a circuit according to a third embodiment of the present invention.

Referring to FIG. 3 to illustrate a third embodiment of the present invention, a sound card system 10c employs logic switching by a pair of switches—a left switch 38a and a right switch 38b. Also, some individual components of third embodiment 10c are essentially the same as described with respect to the first and second embodiments 10a and 10b, including primary connector 16, header 18, secondary connector 22, and wiring harness 24. A double prime (") designation will be employed to refer to components or elements of the third embodiment 10c that in some cases correspond to similarly situated components or elements of the first embodiment 10a, and in other cases for convenience and consistency.

Sound card system 10c includes a first left op-amp 32a", a first right op-amp 32b", a second left op-amp 33a", and a second right op-amp 33b". The first left and first right op-amps 32a" and 32b" are electrically coupled to the resistors R1" and R3", and header pins 36a" and 36c", respectively, as described above with respect to the second embodiment sound card system 10b.

Left switch 38a is electrically coupled between the processing circuit left output 31a" and the input of second left op-amp 33a". Right switch 38b is electrically coupled between the processing circuit right output 31b" and the input of second right op-amp 33b". Resistors R2" and R4" are electrically coupled between the outputs of the second left and second right op-amps 33a" and 33b" and primary connector left and right contacts 44a and 44b, respectively. Thus, the line from first left op amp 32a" to header contact 36a" is in parallel with the line from left switch 36a" to primary connector left contact 44a, and the line from first right op-amp 32b" to connector pin 36c" is in parallel with the line from right switch 38b to primary connector right contact 44b. Header contact 36e" is coupled to ground 40.

A control voltage V is supplied to each one of the left and right switches 38a and 38b. Control voltage V is also electrically coupled to header pin 36b". Switches 38a and 38b are normally open, and FIG. 3 shows the switches in the energized, closed position. Preferably, control voltage V is positive five volts, although any suitable voltage may be employed.

Thus, in the first configuration according to the third embodiment of the present invention, the audio signal from the circuit outputs 31a" and 31b" passes through closed switches 38a and 38b through the second op-amps 33a" and 33b" and corresponding resistors R2" and R4" to primary connector contacts 44a and 44b. As described with respect to the other embodiments, primary connector 16 mutes the audio signal to main output contacts 50a and 50b in response to insertion of primary plug 62 into primary socket 60, which are shown in FIG. 4.

In the second configuration, in which secondary connector 22 is connected to header 18 via wiring harness 24, the audio signal from the first left and first right op-amps 32a" and 32b" are electrically coupled to secondary connector contacts 56a and 56b. In response to insertion of secondary plug 68 into secondary socket 66, switches 54a and 54b short second pin 36b" to ground 40 via header ground pin 36e". Thus, control voltage V, which is electrically coupled to header second pin 36b", is shorted to ground 40, thereby enabling switches 38a and 38b to open automatically to their normally-open position and thereby interrupting the connection between the primary connector 16 and the audio signal to mute the audio signal at the primary connector 16 and the main output contacts 50a and 50b.

Op-amps 33a" and 33b" are not shorted to ground in the third embodiment, which may be an advantage in some circumstances, for example where op-amps 33a" and 33b" are output-sensitive, or if R2" or R4" are small or omitted, especially if op-amps 33a" and 33b" are driving speakers.

Figure 6:
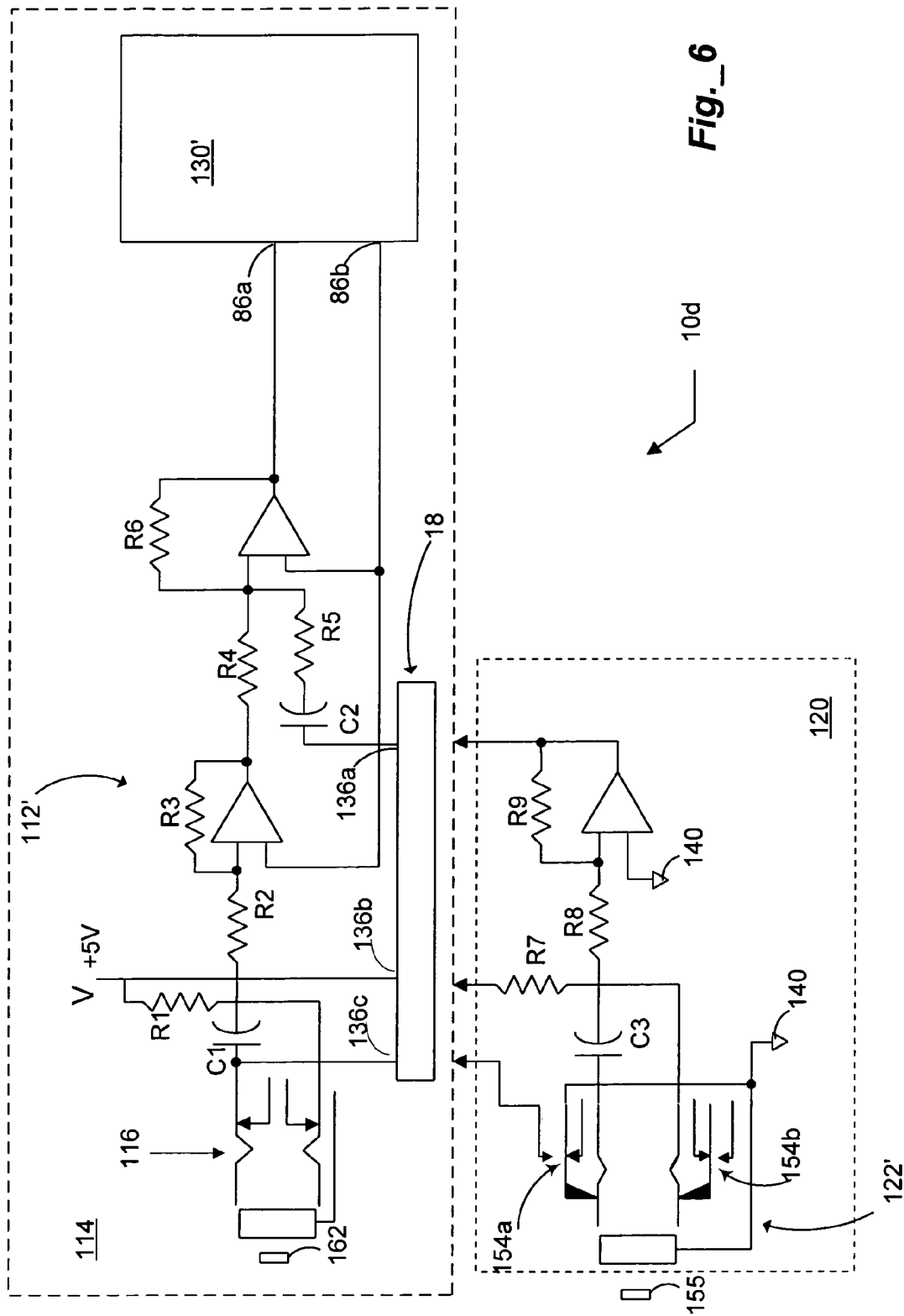
FIG. 6 is a schematic showing a circuit according to a fourth embodiment of the present invention.
Figure 7:
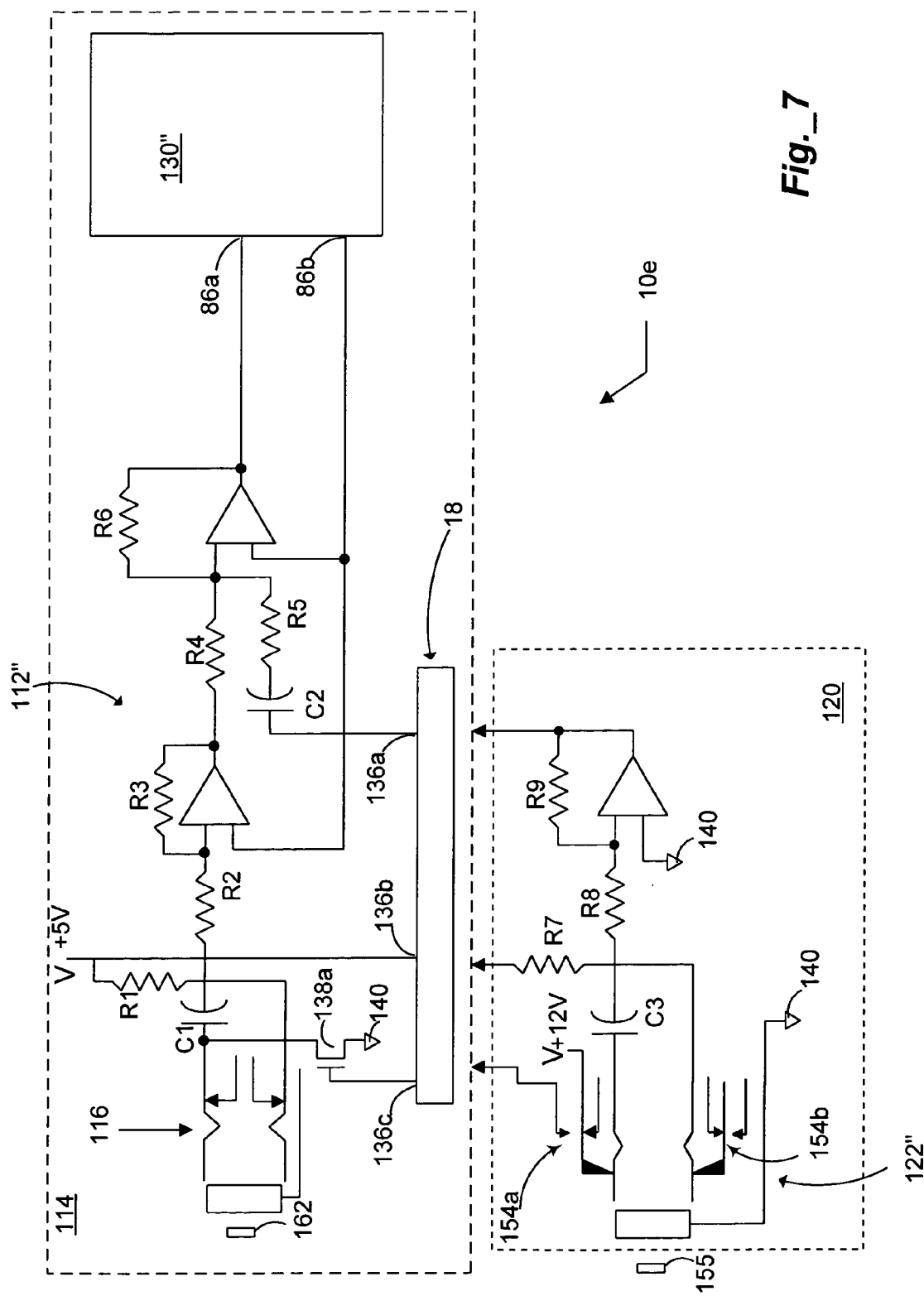
FIG. 7 a schematic showing a circuit according to a fifth embodiment of the present invention.

FIGS. 6, 7, 8, and 9 illustrate the present invention employed with input connectors, rather than the output connectors described above with respect to the first three embodiments. In the fourth and fifth embodiments of the present invention, which are illustrated by FIGS. 6 and 7 respectively, a condenser microphone illustrates an input connector that requires a control voltage. In the sixth and seventh embodiments of the present invention, which are illustrated by FIGS. 8 and 9, a dynamic microphone illustrates an input connector that does not require a control voltage. Thus, the sixth and seventh embodiments may be employed with a line level signal such that the connectors may be employed for connecting a line level signal, such as for any stereo component. FIGS. 6 through 9 employ three digit reference numerals, which include a numeral 1 followed by a two digit extension to indicate that the component particular component is similar or analogous to that designated by the two digit extension, except that the component must be chosen to be suitable for the surrounding components of the particular application, which will be clear to persons familiar with sound card and/or circuit technology.

Referring to FIGS. 6 and 7 to illustrate the fourth and fifth embodiments of the present invention, a sound card system 10d includes an audio input device 130, which preferably is a codec, a printed circuit board 114, a primary connector 116, a connector header 18, and, optionally, a secondary connector assembly 120, which includes a secondary connector 122' (or 122") and a wiring harness (not shown for clarity). PCB 114 is shown surrounded by dashed lines to indicate that the components, or connectors that link to the components, of the circuit 112' may be disposed thereon. Device 130 includes a microphone input 86a and a reference voltage output 86b.

Primary connector 116 is coupled to a signal voltage V, which preferably is 5 volts analog. Op-amps, resistors, and capacitors are shown coupled between primary connector 116 and device 130' (as well as in secondary system 120) to round out the functionality circuit. Header 18 includes three pins: a first pin 136a is coupled to the microphone input 86a and a second pin 136b is coupled to the signal voltage V. In fourth embodiment 10d, a third pin 136c is coupled to the primary connector 116, and preferably to the output side of the connector as shown in FIG. 6. In the fifth embodiment 10e, a third pin 136c is coupled to the gate of an FET 138a, which is coupled between a ground 140 and primary connector 116. In each of the embodiments 10d and 10e, secondary connector 122' includes a pair of switches 154a and 154b.

Referring particularly to FIG. 6, one contact of switch 154a is coupled to header third contact 136c, and another contact thereof is coupled to a ground 140. A contact of secondary connector 122' is coupled to the signal voltage V via second pin 136b and another contact of secondary connector 122' is coupled to microphone input 86a via first pin 136a.

Referring particularly to FIG. 7, on contact of switch 154a is coupled to header third contact 136c, and another contact thereof is electrically coupled to a control voltage V, which preferably is 12 volts. A contact of secondary connector 122" is coupled to the signal voltage V via second pin 136b and another contact of secondary connector 122" is coupled to microphone input 86a via first pin 136a.

Thus, each of the configurations 10d and 10e are operable without secondary system 120 coupled thereto, and with secondary system 120 coupled thereto and without a secondary plug 155 inserted into secondary connector 122' or 122", such that primary connector 116 is capable of receiving a microphone plug 162 that sends a sound signal through the electronic components to input 86a. Upon insertion of secondary plug 155 into secondary connector 122' or 122' while the secondary system 120 is connector to the main system, switch 154a shorts primary connector 16 to ground directly through pin 136c in the fourth embodiment 10d, and enables control voltage V to act on the gate of normally open FET 138a, thereby grounding primary connector 116 through FET 138a to ground 140a in the fifth embodiment 10e. In each case, the primary connector is thus turned off (that is, its signal is shorted to ground), and the secondary connector 122' or 122" is capable of communication with input 86a.

In the sixth and seventh embodiments 10f and 10g of the present invention, a sound card system includes an audio input device 129, a printed circuit board 114, a primary connector 116, a connector header 18, and, optionally, a secondary connector assembly 120, which includes a secondary connector 122' (or 122") and a wiring harness 124. The present invention encompasses employing any audio input device 129 suitable for the configuration shown, such as a stereo receiver, mixer, or tape deck, and like devices, including corresponding circuitry, or even merely a connector that receives an audio signal from any other source. Further, in addition to the dynamic microphone discussed above, the connector 116 may be any connector for connecting a line level signal to the main system, and any component that may produce a line level signal in may replace the dynamic microphone. PCB 114 is shown surrounded by dashed lines to indicate that the components, or connectors that link to the components, of the circuit 112' or 112" may be disposed thereon.

Device 129 may include a pair of two channel connections: a pair of primary channels 131a and 131b, and a pair of secondary channels 131c and 131d. Channels 131a, 131b, 131c, and 131d are coupled to pins 136a, 136b, 136c, and 136d, respectively, of the connector header 18. Further, in embodiment 10f, pins 136a and 136b are also connected to the corresponding connections to primary connector 116 (that is, to each side of primary connector 116). In the seventh embodiment 10g, the gates of a pair of FETs 138a and 138b are coupled a second pin 136b. The FETs 138a and 138b are coupled between a ground 140 and contacts of primary connector 116. In each embodiment 10f and 10g, the secondary connector 122' or 122" is coupled to channels 131c and 131d via pins 136c and 136d, respectively. In embodiment 10g, pin 136b is omitted for clarity. Without secondary system connected thereto, primary connector 116 may communicate with device 129 through channels 131a and 131b.

In the second sixth and seventh embodiments, secondary connector system 120 may coupled to the main system in the second configuration. Secondary connector system 120 also includes a pair of switches 154a and 154b that change position upon insertion of a secondary plug 155 into secondary connector 120. In the sixth embodiment 10f, a contact of switch 154a is coupled to a ground 140 and another contact of switch 154a is coupled to pin 136a. Likewise, a contact of switch 154b is coupled to a ground 140 and another contact of switch 154b is coupled to pin 136b. Thus, in response to insertion of secondary plug 155 into secondary connector 122', switches 154a and 154b ground each side of the primary connector 116 directly through pins 136a and 136b to turn off primary connector 116.

In the seventh embodiment 10g, a contact of switch 154a is coupled to the gates of each FET 138a and 138b via pin 136a and another contact of switch 154b is coupled to a control voltage V, which preferably is 12 volts. In response to insertion of secondary plug 155 into secondary connector 122", switch 154a connects control voltage V to the gate of each FET 138a and 138b to open the FETs, thereby connecting each side of primary connector 116 to ground 140 to turn off primary connector 116.

Referring to FIG. 10 to illustrate another aspect of the present invention, an audio system is shown that includes a main system 15 and secondary system 23. Main system 15 includes a primary connector 17, a connector 18, and (optionally) main output contacts 50a and 50b. Main system 15 may be a circuit 12 and PCB 14 as described above, or any one of a device for connecting a televison to a computer network such as the internet (which is often referred to as a "set-top box), a television having the signal provided by a cable connection or antennae, an audio receiver, or any other audio system. Primary connector 17 is shown mounted on a local PCB 14'. The circuitry to interconnect the components of main system 15 are omitted from FIG. 10 for clarity, and any of the embodiments described above and any modifications thereof may be employed.

Secondary system 23, which may encompass secondary connector 22 or like connector, is shown spaced apart from main system 15 to illustrate that secondary system 23 may be disposed remotely relative to the local, primary connector 17. Thus, the terms "local" and "remote" as described herein refer to a position local to the main system 15 (such as PCB 14 or 14') and a position spaced apart therefrom, respectively. In this regard, secondary system 23 may be disposed as described above with respect to secondary connector 22 of any one of the above three embodiments, and also encompasses being disposed a relatively large distance therefrom. For example, secondary system 23 may be disposed across a room from main system 15 (such as for example, in a wall, chair console, or other body capable of housing the connector) so as to enable muting of the sound at main output contacts 50a and 50b or similar devices in response to inserting a plug (not shown in FIG. 10) into the secondary system, as described herein. A dashed line 25 is shown connecting main system 15 with secondary connector 23 to indicate that any conventional interconnection may be employed, including a wiring harness or a wireless connection having a component that may plug into connector header 18.

In each of the embodiments described herein, the particular characteristics of the op-amps and resistors may be chosen according to conventional engineering and circuit design principles as understood by persons familiar with such technology. Further, the characteristics of similarly situated op-amps and resistors among the embodiments may each possess differing attributes and characteristics such that, for example, op-amps 32a, 32a', and 32a" may be mutually unique and resistors R1, R1', and R1" may be mutually unique according to the requirements of the particular circuit and application.

The present invention is illustrated with respect to the three embodiments described herein, although the present invention is not limited to particular three embodiments. Rather, the present invention encompasses embodiments, features, and aspects that will be apparent to persons familiar with sound card or circuit technology in light of the present disclosure and in accordance with the appended claims. For merely one example, the present invention is illustrated with respect to a personal computer, although the present invention may be employed with virtually any analog or digital device that plays sound. The present invention is not limited to employing front and rear headphone connectors, unless the particular claim explicitly recites such a headphone connector. The invention contemplates that the essential elements of the circuit and devices described herein as being disposed in a sub-circuit or sub-system of a larger system, and therefore additional components may be included and even interspersed within the components described herein and remain within the scope of the present invention. Further, the invention is not limited to devices with left and right channels, but encompasses devices, circuits, and methods with a single channel and with multiple channels.

What is claimed is:

1. An audio circuit comprising a sound source having an output for producing an audio signal, a primary connector, and a connector header, said primary connector being electrically coupled to said sound source output to receive the audio signal, said connector header comprising:
- a header first contact electrically coupled to the sound source output;
- a header second contact electrically coupled to said primary connector; and
- a header ground contact that is electrically coupled to a ground;
- each one of said header first contact and said header second contact being ungrounded; said audio circuit adaptable to include a secondary connector circuit having a secondary connector and comprising:
- a secondary connector first contact electrically coupled to said header first contact;
- a normally-open secondary connector second contact electrically coupled to said header second contact; and
- a normally-open switch electrically coupled to said header ground contact; said switch being operable to electrically couple said header second contact to said header ground contact to short said primary connector to said ground while said switch is in its closed position;
- said audio circuit being operable in each one of a first configuration that does not include said secondary connector circuit and a second configuration that includes said secondary connector circuit.

2. The audio circuit of claim 1 further comprising a main output contact disposed on the printed circuit board and being electrically coupled to said sound source output to receive the audio signal, the primary connector including a switch capable of muting the audio signal to the main output contact.

3. The audio circuit of claim 1 wherein said header includes:
- a header fourth contact electrically coupled to a right channel signal of the sound source output, and a header third contact electrically coupled to a right contact of said primary connector;
- said header first contact being electrically coupled to a left channel signal of the sound source output, said header second contact being electrically coupled to a left contact of said primary connector; said secondary connector circuit including an other switch coupled to said header ground contact; said other switch being operable to electrically couple said header third contact to said header ground contact to short said right contact of said primary connector to said ground while said switch is in its closed position.

4. The audio circuit of claim 3 wherein said header first contact, said header second contact, said left channel signal of said sound source output, and said left contact of said primary connector form a left audio channel; and said header fourth contact, said header third contact, said right channel signal of the sound source output, and said right contact of said primary connector form a right audio channel.

5. The audio circuit of claim 1, configured in the second configuration wherein each one of said sound source output, said primary connector, and said connector header are mechanically affixed to a printed circuit board and the secondary connector is spaced apart from the printed circuit board, said secondary connector being connected to said header by a wiring harness.

6. The audio circuit of claim 5 wherein said primary connector is a local connector and said secondary connector is a remote connector.

7. The audio circuit of claim 6 wherein said primary connector is a rear headphone connector and said secondary connector is a front headphone connector.

8. The audio circuit of claim 2 wherein each one of said sound source output, said primary connector, and said main output contact being electrically coupled together in series such that said main audio contact receives the audio signal from the audio circuit through said primary connector.

9. The audio circuit of claim 1 further comprising a first op-amp, a first resistor, and a second resistor, said first op-amp electrically coupled to said sound source output, said first op-amp and said first resistor being electrically coupled between said sound source output and said header first contact, said second resistor being electrically coupled between said first op-amp and said primary connector.

10. The audio circuit of claim 9 wherein said first op-amp, said first resistor, and said header first contact are electrically coupled together in series, said second resistor is electrically coupled between an output of said op-amp and said header second connector; and
- said second resistor is electrically coupled between the output of said op-amp and said primary connector such that said header second contact and said primary connector are electrically coupled together in parallel relative to said second resistor.

11. The audio circuit of claim 4 further comprising a first op-amp, a second op-amp, a first resistor, a second resistor, a third resistor, and a fourth resistor; said first op-amp, said first resistor, and said header first contact being electrically coupled together in series, said second resistor being electrically coupled between an output of said first op-amp and said header second contact, and said second resistor being electrically coupled between the output of said first op-amp and said left contact of said primary connector such that said header second contact and said primary connector are electrically coupled together in parallel relative to said second resistor, said second op-amp; said second op-amp, said third resistor, and said header third contact being electrically coupled together in series, said fourth resistor being electrically coupled between an output of said second op-amp and said header fourth contact, and said fourth resistor being electrically coupled between the output of said second op-amp and said right contact of said primary connector such that said header fourth contact and said right contact of said primary connector are electrically coupled together in parallel relative to said fourth resistor.

12. The audio circuit of claim 1 further comprising a first op-amp, a second op-amp, a first resistor, and a second resistor, each one of said first op-amp and second op-amp electrically coupled to said sound source output in parallel, said first op-amp and said first resistor being electrically coupled between said sound source output and said header first contact, said second resistor being electrically coupled between said second op-amp and each of said header second contact and said primary connector such that said header second contact and said primary connector are coupled in parallel relative to said second connector.

13. The audio circuit of claim 12 further comprising a third op-amp, a fourth op-amp, a third resistor, and a fourth resistor; each one of said third op-amp and said fourth op-amp being electrically coupled to a right channel signal of said audio circuit in parallel, said third op-amp, said third resistor, and said header third contact being electrically coupled together in series, said fourth resistor being electrically coupled between an output of said fourth op-amp and said header fourth contact, and said fourth resistor being electrically coupled between the output of said fourth op-amp and said right contact of said primary connector such that said header fourth contact and said right contact of said primary connector are electrically coupled together in parallel relative to said fourth resistor; whereby said first op-amp and said first resistor are electrically coupled between a left channel signal of said sound source output and said header first contact, and said second resistor is electrically coupled between said second op-amp and each of said header second contact and a left contact of said primary connector such that said header second contact and said left contact of said primary connector are coupled in parallel relative to said second connector.

14. The audio circuit of claim 12 further comprising a main output contact disposed on the printed circuit board and being electrically coupled to said sound source output to receive the audio signal, the primary connector including a switch capable of muting the audio signal to the main output contact.

15. A dual-configuration audio system for processing an audio signal, said audio system being operable in each one of a first configuration and a second configuration, wherein:
said first configuration comprises:
a printed circuit board having a sound source mounted thereon, said sound source providing the audio signal;
a connector header having plural contacts therein and coupled to the printed circuit board and being in electrical communication with the sound source such that the audio signal is coupled to said header; and
an auto-muting primary connector including a primary socket coupled to the printed circuit board for removably receiving a primary plug, said primary connector receiving the audio signal; and said second configuration comprises said printed circuit board, said header, and said primary connector, and further comprises:
a secondary connector including a secondary socket being spaced apart from said printed circuit board for removably receiving a secondary plug; and
a wiring harness having a wiring harness plug that is insertable into said header, said wiring harness electrically coupling said secondary connector to said header such that the secondary connector receives the audio signal.

16. The dual-configuration audio system of claim 15 wherein the audio signal is muted at the primary connector in response to insertion of the secondary plug into the secondary connector in the second configuration.

17. The dual-configuration audio system of claim 16 wherein the primary connector is shorted to a ground in response to insertion of the secondary plug into the secondary connector, thereby muting the audio signal at the primary connector.

18. The dual-configuration audio system of claim 15 further comprising a main output contact in electrical communication with the sound source and coupled to the printed circuit board, said main output contact receiving the audio signal, the audio signal being muted at the main output contact in response to insertion of the primary plug into the primary connector in said first configuration.

19. The dual-configuration audio system of claim 18 wherein the audio signal is muted at the main output contact in response to insertion of the secondary headphone plug into the secondary connector in the second configuration.

20. The dual-configuration audio system of claim 19 wherein the main output contact is shorted to a ground in response to insertion of the secondary plug into the secondary connector, thereby muting the audio signal at the main output contact and the primary connector.

21. The dual-configuration audio system of claim 15 wherein said header includes a non-conductive body and said plural pins that are disposed at least partially within said header body.

22. The dual-configuration audio system of claim 21 wherein said plural pins include an audio signal pin electrically coupled to the sound source for receiving the audio signal, a ground pin electrically coupled to a ground, a primary connector pin electrically coupled to said primary connector; each one of said audio signal pin, said ground pin, and said primary connector pin in said secondary configuration being coupled via said wiring harness to said secondary connector in a mutually open configuration, said secondary connector including a shunt disposed therein.

23. The dual-configuration audio system of claim 22 wherein said shunt electrically couples said primary contact pin to said ground pin in response to insertion of the secondary plug into said secondary connector, thereby muting the audio signal at the primary connector.

24. The dual-configuration audio system of claim 23 further comprising a main output contact electrically coupled to the sound source for receiving the audio signal through said primary connector, said primary connector including an auto-muting switch that interrupts the audio signal in response to insertion of the primary plug into said primary connector.

25. The dual-configuration audio system of claim 24 wherein insertion of the secondary plug into said secondary connector shorts each one of said main output contact and said primary connector to ground.

26. The dual-configuration audio system of claim 24 wherein the main output contact is a loudspeaker contact.

27. The dual-configuration audio system of claim 21 wherein said plural pins include a left audio signal pin electrically coupled to the sound source for receiving a left channel signal of the audio signal, a right audio signal pin electrically coupled to the sound source for receiving a right channel signal of the audio signal, a ground pin electrically coupled to a ground, a left primary connector pin electrically coupled to a left contact of said primary connector, a right primary connector pin electrically coupled to a right contact of said primary connector; each one of said left audio signal pin, said right audio signal pin, said left primary connector pin, said right primary connector pin, and said ground pin coupled to said primary connector in a mutually open circuit; each one of said audio signal pin, said ground pin, and said primary connector pin in said secondary configuration being coupled via said wiring harness to said secondary connector, said secondary connector including a left shunt and a right shunt disposed therein, said left shunt electrically coupling said left primary connector pin to said ground pin in response to insertion of the secondary plug into said secondary connector, said right shunt electrically coupling said right primary connector pin to said ground pin in response to insertion of the secondary plug into said secondary connector.

28. The dual-configuration audio system of claim 27 further comprising a left main output contact and a right main audio contact, said left main output receiving a left channel signal of the audio signal through a left contact of said primary connector, said right main output receiving a right channel signal of the audio signal through a right contact of said primary connector, said primary connector including an auto-muting switch that interrupts the audio signal to each one of said left main audio contact and said right main audio contact in response to insertion of the primary plug into said primary connector, each one of said left main audio contact, said right main audio contact, said primary connector left contact, and said primary connector right contact being shorted to the ground in response to insertion of the secondary plug into said secondary connector.

29. The dual-configuration audio system of claim 15 wherein the sound source includes a coder/decoder processor that converts a digital input to an analog output to produce said audio signal.

30. The dual-configuration audio system of claim 15 wherein the primary connector is a local connector and said secondary connector is a remote connector, and said secondary plug is a secondary headphone plug.

31. The dual-configuration audio system of claim 30 wherein the primary connector is a primary headphone jack, said primary plug is a primary headphone plug, said secondary connector is a secondary headphone jack, and said secondary plug is a secondary headphone plug.

32. The dual-configuration audio system of claim 15 wherein the sound source is a codec.

33. The dual-configuration audio system of claim 29 wherein said primary headphone jack is accessible from a rear of a computer and said secondary headphone jack is accessible from a front of the computer.

34. The dual-configuration audio system of claim 15 further comprising a first op-amp, a second op-amp, a first resistor, and a second resistor, each one of said first op-amp and second op-amp electrically coupled to said sound source, said first op-amp and said first resistor being electrically coupled between said sound source and a header first contact, said second resistor being electrically coupled between said second op-amp and each of a header second contact and said primary connector such that said header second contact and said primary connector are coupled in parallel relative to said second connector.

35. An audio circuit comprising an audio signal device, a primary connector, and a switchless connector header, each one of the audio signal device, the primary connector, and the connector header being disposed on a printed circuit board, said audio circuit adaptable to include a secondary connector circuit comprising a secondary connector and a normally open secondary connector switch, said switch operating in response to insertion of a secondary plug into said secondary connector to mute or turn off said primary connector; said audio circuit being operable in each one of a first configuration that does not include said secondary circuit and a second configuration that includes said secondary circuit.

36. The audio circuit of claim 35 wherein the audio signal device is an audio input device for receiving an audio signal, said primary connector being electrically coupled to audio input device, said connector header comprising:
   a first contact electrically coupled to an input of said audio signal device;
   a second contact electrically coupled to a signal voltage; and
   a third contact electrically coupled to the primary connector;
   said secondary connector switch disposed between the secondary connector and a ground, said secondary connector being electrically coupled between a ground and said third contact, said switch closing to short said primary connector to ground via said third contact in response to insertion of a secondary plug into said secondary connector, thereby turning off said primary connector.

37. The audio circuit of claim 35 wherein the audio signal device is an audio input device for receiving an audio signal, said primary connector being electrically coupled to audio input device, said connector header comprising:
   a first contact electrically coupled to an input of said audio signal device;
   a second contact electrically coupled to a signal voltage; and
   a third contact electrically coupled to a control portion of a normally open primary switch primary connector, the switch being electrically coupled between the primary connector and a ground; said secondary connector switch being disposed between the secondary connector and a ground, said secondary connector being electrically coupled between a control voltage and said third contact, said secondary connector switch closing to couple the control voltage to the control portion of the primary switch via said third contact in response to insertion of a secondary plug into said secondary connector, thereby closing the primary switch to turn off said primary connector.

38. The audio circuit of claim 37 wherein the control potion of the switch is a gate of an FET.

39. The audio circuit of claim 35 wherein the audio circuit is an audio input device for receiving an audio signal, said primary connector being electrically coupled to audio input device, said connector header comprising:
   a first pair of contacts electrically coupled to a primary pair of channels of the audio input device and coupled to opposing sides of said primary connector;
   a second pair of contacts electrically coupled to a secondary pair of channels of the audio input device said secondary connector switch being a pair of secondary connector switches disposed between the secondary connector and the first pair of header contacts, each one of the secondary connector switches having a contact that is coupled to a ground and another contact that is coupled to one of the first pair of header contacts, said secondary connector being electrically coupled to the audio input device via said second pair of contacts, the pair of secondary connector switches closing to electrically couple each side of the primary connector to ground via the first pair of header contacts to short said primary connector to ground in response to insertion of a secondary plug into said secondary connector, thereby turning off said primary connector.

40. The audio circuit of claim 35 wherein the audio circuit is an audio input device for receiving an audio signal, said primary connector being electrically coupled to a pair of primary channels of the audio input device, said connector header comprising:
   a first contact electrically coupled to control portions of a pair of normally open primary switches that are electrically coupled between the primary connector and a ground;
   a pair of second contacts electrically coupled to a secondary pair of channels of the audio input device;
   the secondary connector switch having a contact that is coupled to a control voltage and another contact that is coupled to the first header contacts, said secondary connector being electrically coupled to the audio input device via the pair of second contacts, the secondary connector switch closing to electrically couple the control voltage to the control portion of the primary switches via the first contact in response to insertion of a secondary plug into said secondary connector, thereby closing the primary switch to turn off said primary connector.

41. The audio circuit of claim 40 wherein the primary switches are FETs and the control potion of each switch is a gate of the FET.

42. A method of coupling a secondary connector to a sound source that is operable for processing an audio signal either without the secondary connector or with the secondary connector coupled thereto, said method comprising the steps of:
   providing a sound source for producing an audio signal, a connector header, and a primary connector, the header having three electrically spaced-apart contacts disposed therein, a first one of the three header contacts receiving the audio signal, a second one of the three header contacts electrically coupled to the primary connector, a third one of the three header contacts electrically coupled to a ground; and
   removably coupling a secondary connector to said sound source via the header such that a switch in the secondary connector shorts the third header contact to the second header contact to mute the audio signal at the primary connector, the first header contact providing the audio signal to the secondary header.

43. An audio circuit having a generated audio signal electrically coupled to a header having a plurality of pins, and to a second audio output terminal, the audio circuit comprising:
   a primary jack electrically coupled to the audio signal; and
   the connector header having a first pin of the plurality of pins coupled to the generated audio signal and adaptable for removable connection with a secondary circuit having a secondary jack;
   wherein the secondary jack is configured such that upon insertion of a secondary plug, the first pin on the connection header is grounded, such as to mute the audio signal at a primary audio output terminal.

* * * * *